United States Patent
Medvedev et al.

(10) Patent No.: US 8,037,473 B2
(45) Date of Patent: Oct. 11, 2011

(54) METHOD TO SHARE LICENSED APPLICATIONS BETWEEN VIRTUAL MACHINES

(75) Inventors: Alexander Medvedev, Austin, TX (US); Vasu Vallabhaneni, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1391 days.

(21) Appl. No.: 11/551,463

(22) Filed: Oct. 20, 2006

(65) Prior Publication Data

US 2008/0098391 A1    Apr. 24, 2008

(51) Int. Cl.
- G06F 9/455 (2006.01)
- G06F 9/46 (2006.01)
- G06F 15/173 (2006.01)
- G06F 15/16 (2006.01)
- G06F 21/00 (2006.01)

(52) U.S. Cl. ............ 718/1; 718/100; 709/225; 709/231; 705/57; 705/59

(58) Field of Classification Search .................. None
See application file for complete search history.

(56) References Cited

U.S. PATENT DOCUMENTS

| | | | |
|---|---|---|---|
| 6,735,601 B1 * | 5/2004 | Subrahmanyam | 1/1 |
| 6,868,451 B1 * | 3/2005 | Peacock | 709/231 |
| 7,546,599 B2 * | 6/2009 | Nesher et al. | 718/1 |
| 7,765,544 B2 * | 7/2010 | Brickell et al. | 718/1 |
| 2006/0074869 A1 * | 4/2006 | Rosenberg et al. | 707/3 |
| 2006/0149899 A1 * | 7/2006 | Zimmer et al. | 711/112 |

OTHER PUBLICATIONS

Bowen Alpern; PDS: A Virtual Execution Environment for Software Deployment; VEE '05 Proceedings of the 1st ACM/USENIX international conference on Virtual execution environments 2005; pp. 175-185.*

* cited by examiner

*Primary Examiner* — Jennifer To
*Assistant Examiner* — Abdullah Al Kawsar
(74) *Attorney, Agent, or Firm* — Yee & Associates, P.C.; Justin M. Dillon

(57) ABSTRACT

A computer implemented method and computer program product for sharing licensed applications between virtual machines. When an event is intercepted which comprises an attempted access of a file stored in a hard disk of a guest operating system, wherein the file type has no association with any application installed on the guest operating system, an application installed on a host operating system capable of opening the file is identified. An association of the file type with an application on the host operating system is established, and the file is copied from the hard disk of the guest operating system to a temporary location on the host operating system. The file is opened and accessed using the associated application on the host operating system. The file is then copied back to the hard disk of the guest operating system.

6 Claims, 2 Drawing Sheets

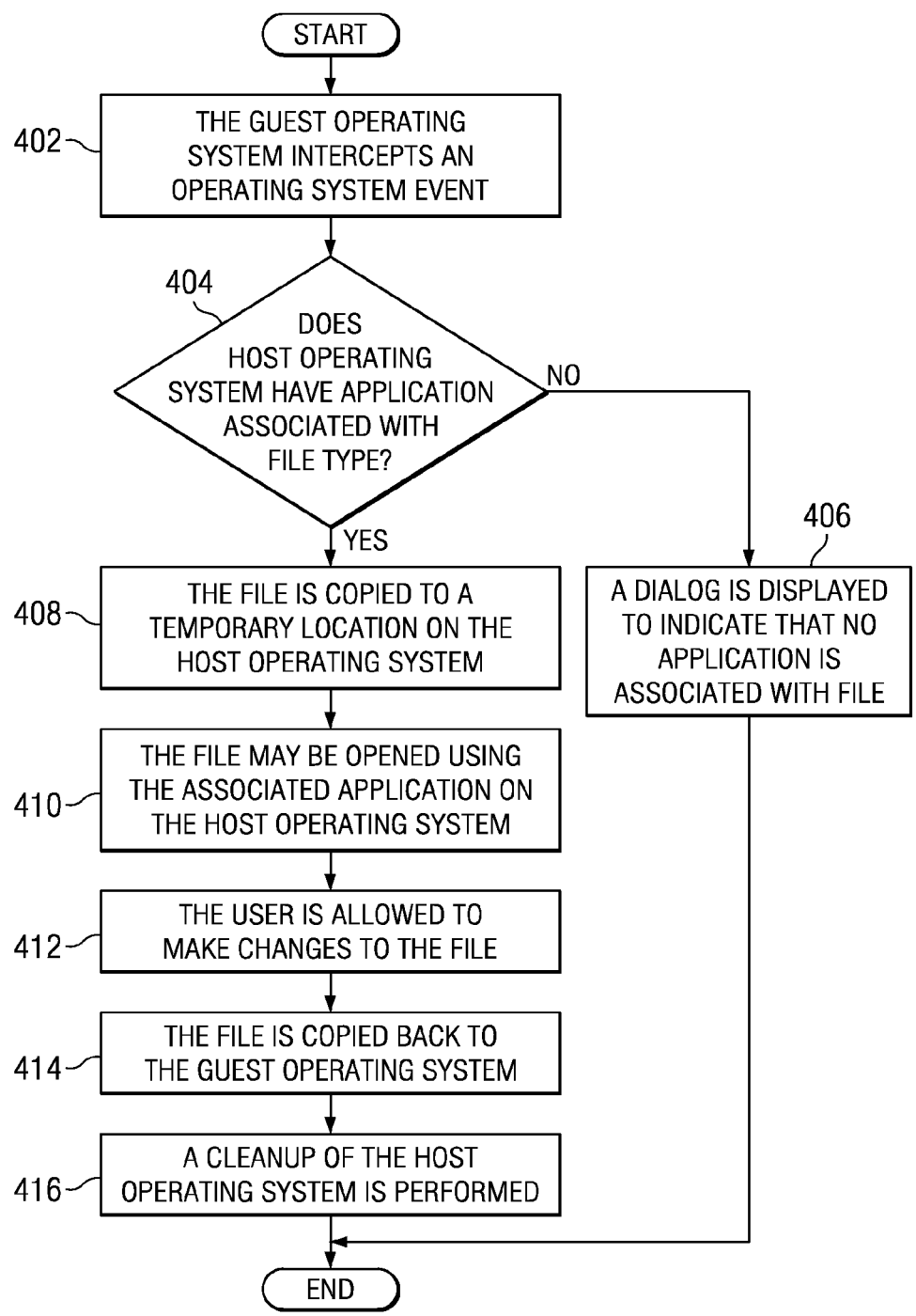

METHOD TO SHARE LICENSED APPLICATIONS BETWEEN VIRTUAL MACHINES

BACKGROUND OF THE INVENTION

1. Field of the Invention

The present invention relates generally to an improved data processing system, and in particular, to a computer implemented method and computer program product for sharing licensed applications between virtual machines.

2. Description of the Related Art

A virtual machine monitor (VMM) is a host program that allows a single computer to support multiple, identical execution environments. An example of a commercial VMM product is VMware®, which is a product of VMware Inc. VMware® is a virtual machine software system that allows a host operating system to run one or more virtual guest operating systems. For example, a system running Windows XP may use VMware® to run an operating system such as Linux or Windows 2000. Once the guest operating system is running, applications may be installed and services may be run which the guest operating system supports. The computing environments created (comprising the guest operating systems) are referred to as virtual machines.

While virtual machine monitors allow users to easily access multiple operating systems without using two separate desktop machines or a dual-boot computer, there can be problems when opening files which are associated with certain applications. Consider the example of an x86-based personal computer (PC) which is running Microsoft Windows as the host operating system, as well as another instance of Microsoft Windows running in VMware as the guest operating system. In this example, the host operating system has an application such as Microsoft Excel installed, and the guest operating system does not have the application installed. When a user wants to open an Excel file located on the guest operating system's hard disk, the user double-clicks the Excel file. Since the guest operating system does not have the Microsoft Excel application installed, a dialog is presented to the user which indicates that there is no application associated with the selected file type. In response, the user currently must drag and drop the Excel file from the guest operating system to the desktop of the host operating system, which does contain the Microsoft Excel program. The user may then double click on the Excel file in order to view the file and make changes. The user then drags and drops the Excel file from the host operating system back to the guest operating system. These existing steps are prone to errors, such as the user forgetting to drag the file back into the virtual machine (guest operating system), or having older copies lying around which can create havoc in version numbers.

SUMMARY OF THE INVENTION

The illustrative embodiments provide a computer implemented method and computer program product for sharing licensed application between virtual machines. When an event is intercepted which comprises an attempted access of a file stored in a hard disk of a guest operating system, wherein the file type has no association with any application installed on the guest operating system, an application installed on a host operating system capable of opening the file is identified. An association of the file type with an application on the host operating system is established, and the file is copied from the hard disk of the guest operating system to a temporary location on the host operating system. The file is opened and accessed using the associated application on the host operating system. The file is then copied back to the hard disk of the guest operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process for sharing licensed applications between virtual machines.

DETAILED DESCRIPTION OF THE PREFERRED EMBODIMENT

Figure 1:
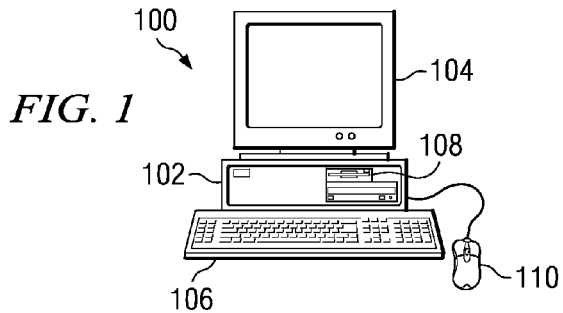
FIG. 1 depicts a pictorial representation of a computer system in which the illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
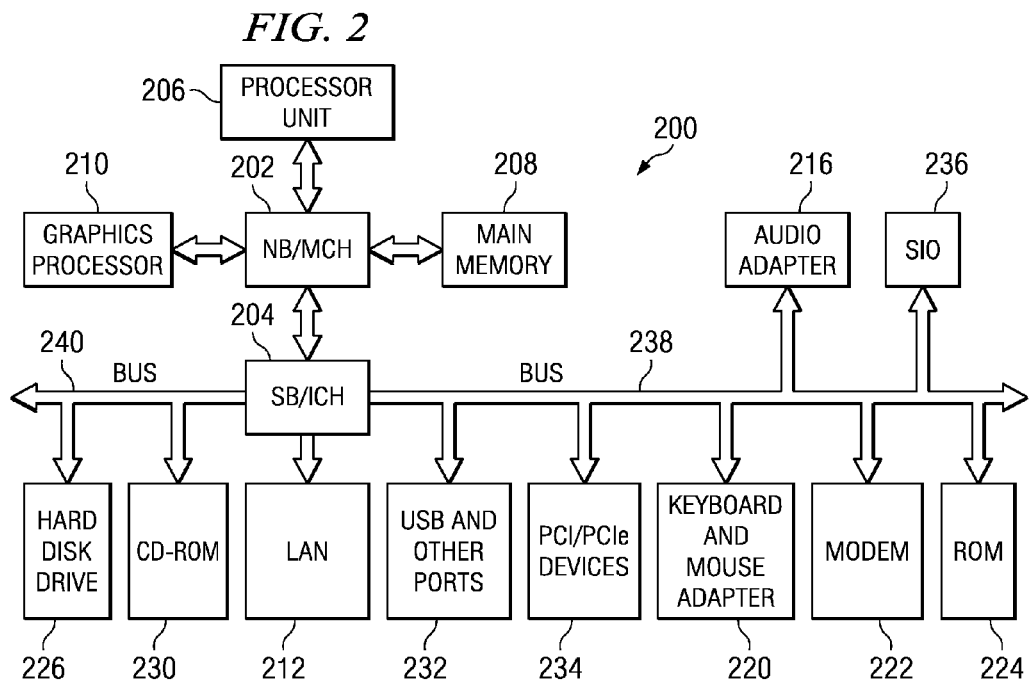
FIG. 2 is a block diagram of a data processing system in which the illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a computer implemented method and computer program product for sharing licensed applications between virtual machines. The illustrative embodiments recognize that when a host operating system is running one or more virtual guest operating systems, it can be difficult to open a file located on the guest operating system's hard disk if only the host operating system, and not the guest operating system, has the application which is associated with the file installed. If a user attempts to open such a file, the user is typically presented with a dialog which indicates that no application is associated with the selected file. The illustrative embodiments address this problem by allowing the guest operating system to intercept certain operating system events and perform actions based on the intercepted event, such as calling an application associated with a certain file type. A file type is a string that describes the contents of a file, as well as identifies the application that can handle the file. For example, the file type ".doc" identifies the file as a Microsoft Word file.

For instance, using the previous example of an x86-based PC running Microsoft Windows as the host operating system and another instance of Microsoft Windows running in VMware as the guest operating system, if a user attempts to open an Excel file located in the guest operating system's hard disk which has no associated application, the illustrative embodiments allow the guest operating system to intercept such an "unknown file type" operating system event. The illustrative embodiments then determine if there is an appropriate application installed in the host operating system which may be used to open the file, such as Microsoft Excel. An appropriate application may be located by viewing the file type associations of the host operating system. If the file type is associated with the Excel application on the host operating system, the Excel file is copied to a temporary location on the host operating system. The Excel file may now be opened using the application on the host operating system, which is associated with the Excel file. The user is allowed to make changes to the file, and the updated file is then copied back to the guest operating system. A cleanup of the host operating system is then performed to remove all temporary files created as a result of the file copying and editing. The method in the illustrative embodiments provides an improvement in the usability of virtual machines, as well as allows for sharing licensed products among different instances of operating systems (i.e., the user is not required to buy a separate Microsoft Excel license for each virtual machine).

Figure 3:
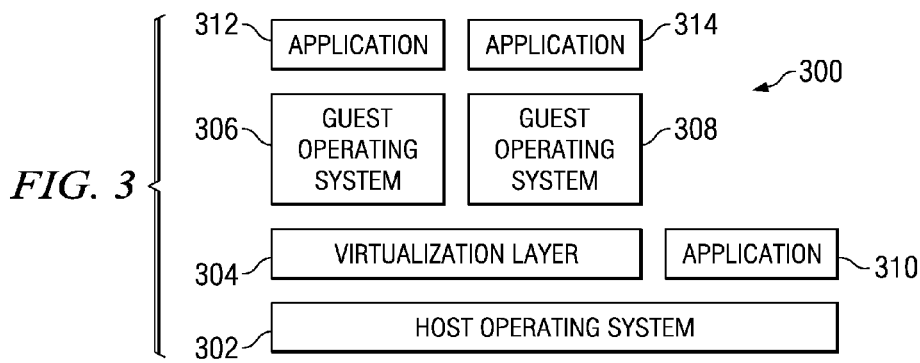
FIG. 3 is a block diagram of an exemplary virtual machine environment in which the illustrative embodiments may be implemented.

Turning now to FIG. 3, a block diagram of an exemplary virtual machine environment in which the illustrative embodiments may be implemented is shown. Virtual machine environment 300 may be implemented in a data processing system, such as data processing system 200 in FIG. 2. In particular, virtual machine environment 300 comprises host operating system 302, virtualization layer 304, guest operating systems 306 and 308, and applications 310, 312, and 314. Host operating system 302 may use a VMM product such as VMware® to run virtual guest operating systems 306 and 308 using VMware®. Virtualization layer 304 manages guest operating systems 306 and 308. Application 310 is installed on host operating system 302, and applications 312 and 314 are supported by guest operating systems 306 and 308 respectively. For instance, a file stored on the hard disks of guest operating systems 306 may be opened if it is associated with application 312. However, if the file is not associated with any application installed on guest operating system 306, an appropriate application installed on host operating system 302, such as application 310, may be used to access the file by checking whether this file type is already registered with the host operating system. If the file is associated with application 310, application 310 may be used to access the file on the host operating system.

FIG. 4 is a flowchart of a process for sharing licensed applications between virtual machines. The process in FIG. 4 may be implemented in a data processing system comprising a host operating system that is running one or more virtual guest operating systems. The process begins when a guest operating system intercepts an operating system event (step 402). An operating system event may include an unknown file type event which occurs when a user attempts to access a file which is located in the guest operating system's hard disk, but the application capable of opening the file is not installed on or supported by the guest operating system. When the guest operating system intercepts such an operating system event, a determination is made by the Virtual Machine as to whether the host operating system has an application installed which is associated with the file type (step 404). If the file type is not associated with an application located on the host operating system ('no' output of step 404), a dialog box is displayed which indicates that no application is associated with the file type (step 406), with the process terminating thereafter.

If the file type is associated with an application located on the host operating system ('yes' output of step 404), the file is copied to a temporary location on the host operating system (step 408). The associated application on the host operating system may then be used to open the file (step 410). At this point, the user is allowed to make changes to the file (step 412). The file may then be copied back to the guest operating system (step 414). Copying the file back to the guest operating system allows the changes made to the file while the file was open to also be reflected in the copy stored on the guest operating system. In one embodiment, if no changes were made to the file, the unchanged file does not need to be copied back to the guest operating system, since a copy of the same file still exists on the guest operating system. A cleanup of the file remaining on the host operating system is then performed (step 416), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sharing licensed applications between virtual machines, the computer implemented method comprising:
   intercepting an event comprising an attempted access of a file stored in a hard disk of a guest operating system, wherein a file type of the file has no association with any application installed on the guest operating system;
   responsive to intercepting the event, identifying an application installed on a host operating system, wherein the application is configured to open the file;
   establishing an association of the file type with the application on the host operating system;
   responsive to establishing the association, copying the file from the hard disk of the guest operating system to a temporary location on the host operating system;
   opening the file using the application that is associated with the file type on the host operating system to allow access to the file;
   copying the file back to the hard disk of the guest operating system if content of the file changed while the file was open; and
   responsive to copying the file back to the hard disk of the guest operating system, performing a cleanup of the host operating system.

2. The computer implemented method of claim 1, wherein the application is identified by viewing file type associations of the host operating system.

3. The computer implemented method of claim 1, wherein the file copied back to the hard disk of the guest operating system is a user-updated file.

4. A computer program product for sharing licensed applications between virtual machines, the computer program product comprising:
- a computer storage device having computer program code stored thereon, the computer program code comprising:
- computer program code for intercepting an event comprising an attempted access of a file stored on a hard disk of a guest operating system, wherein a file type of the file has no association with any application installed on the guest operating system;
- computer program code for identifying an application installed on a host operating system in response to intercepting the event, wherein the application is configured to open the file;
- computer program code for establishing an association of the file type with the application on the host operating system;
- computer program code for copying the file from the hard disk of the guest operating system to a temporary location on the host operating system in response to establishing the association;
- computer program code for opening the file using the application that is associated with the file type on the host operating system to allow access to the file;
- computer program code for copying the file back to the hard disk of the guest operating system if content of the file changed while the file was open; and
- computer program code for performing a cleanup of the host operating system in response to copying the file back to the hard disk of the guest operating system.

5. The computer program product of claim 4, wherein the application is identified by viewing file type associations of the host operating system.

6. The computer program product of claim 4, wherein the file copied back to the hard disk of the guest operating system is a user-updated file.

* * * * *